(12) United States Patent  (10) Patent No.: US 7,757,883 B2
Gilbertson et al.  (45) Date of Patent: Jul. 20, 2010

(54) SIDE-PORTED FILAMENT WOUND PRESSURE VESSELS

(75) Inventors: Terry E. Gilbertson, Prescott Valley, AZ (US); Linda S. Gilbertson, Prescott Valley, AZ (US); Ricardo R. Torres, Escondido, CA (US)

(73) Assignee: Bekaert Progressive Composites, LLC, Vista, CA (US)

( * ) Notice: Subject to any disclaimer, the term of this patent is extended or adjusted under 35 U.S.C. 154(b) by 342 days.

(21) Appl. No.: 11/571,982

(22) PCT Filed: Apr. 7, 2006

(86) PCT No.: PCT/US2006/013482

§ 371 (c)(1),
(2), (4) Date: Jan. 11, 2007

(87) PCT Pub. No.: WO2006/110754

PCT Pub. Date: Oct. 19, 2006

(65) Prior Publication Data

US 2008/0093367 A1  Apr. 24, 2008

Related U.S. Application Data

(60) Provisional application No. 60/670,362, filed on Apr. 11, 2005.

(51) Int. Cl.
*B65H 81/00*  (2006.01)
(52) U.S. Cl. .................. 220/590; 220/588; 220/589; 156/169; 156/173; 156/175; 428/36.3
(58) Field of Classification Search .............. 156/169, 156/172, 173, 175; 428/34.6, 34.7, 36.3; 220/588–590
See application file for complete search history.

(56) References Cited

U.S. PATENT DOCUMENTS

| 2,843,153 | A | 7/1958 | Young |
| 3,106,940 | A | 10/1963 | Young |
| 3,112,234 | A | 11/1963 | Krupp |
| 3,293,860 | A | 12/1966 | Stedfeld |
| 3,394,738 | A | 7/1968 | Baron et al. |
| 3,969,812 | A | 7/1976 | Beck |
| 3,977,614 | A | 8/1976 | Hardwick |
| 4,034,934 | A | 7/1977 | Hardwick |

(Continued)

OTHER PUBLICATIONS

Pentair Water CodeLineTM OCTA 80R60 Membrane Housing dated Sep. 28, 2004.*

*Primary Examiner*—Jeff H Aftergut
(74) *Attorney, Agent, or Firm*—Fitch, Even, Tabin & Flannery

(57) ABSTRACT

A method of making a cylindrical pressure vessel (11) with a large diameter port in its sidewall includes the step of providing a mandrel (23) of desired diameter and filament winding upon the same. After winding one overall innermost layer, an annular reinforcement belt (16) is helically wound atop a defined region using a band (60) of resin impregnated parallel strands (39) under tension. The annular belt (16) is then itself helically overwound with the resin impregnated parallel strands of filamentary material under tension to provide two complete outer layers. After curing and removal from the mandrel (23) at least one aperture (71) is cut in the sidewall within the reinforcement belt (16) and a side port fitting (75) is installed in the aperture (71).

13 Claims, 3 Drawing Sheets

U.S. PATENT DOCUMENTS

| | | | |
|---|---|---|---|
| 4,053,081 A | 10/1977 | Minke | |
| 4,358,377 A | 11/1982 | Clark | |
| 4,391,301 A | 7/1983 | Pflederer | |
| 4,530,379 A | 7/1985 | Policelli | |
| 4,614,279 A | 9/1986 | Toth et al. | |
| 4,685,589 A | 8/1987 | Benton | |
| 4,699,288 A | 10/1987 | Mohan | |
| 4,700,868 A | 10/1987 | Dirkin | |
| 4,740,262 A | 4/1988 | Yavorsky et al. | |
| 4,765,507 A * | 8/1988 | Yavorsky et al. | 220/590 |
| 4,917,756 A | 4/1990 | Cahuzac et al. | |
| 5,257,761 A | 11/1993 | Ratz et al. | |
| 5,273,603 A | 12/1993 | Park et al. | |
| 5,305,601 A | 4/1994 | Drain et al. | |
| 5,352,309 A * | 10/1994 | Oswald | 156/154 |
| 5,556,497 A | 9/1996 | Murphy et al. | |
| 5,683,530 A | 11/1997 | Fawley et al. | |
| 5,772,938 A | 6/1998 | Sharp | |
| 5,819,978 A | 10/1998 | Hlebovy | |
| 5,900,107 A | 5/1999 | Murphy et al. | |
| 6,074,595 A * | 6/2000 | Eisberg et al. | 264/496 |
| 6,138,861 A | 10/2000 | Palazzo | |
| 6,165,303 A * | 12/2000 | Darby et al. | 156/175 |
| 6,485,668 B1 | 11/2002 | Murphy et al. | |
| 6,558,544 B1 | 5/2003 | Eisberg et al. | |
| 2003/0019874 A1 | 1/2003 | Wright et al. | |
| 2004/0188445 A1 | 9/2004 | Debecker et al. | |
| 2006/0289546 A1* | 12/2006 | Carter | 220/565 |

* cited by examiner

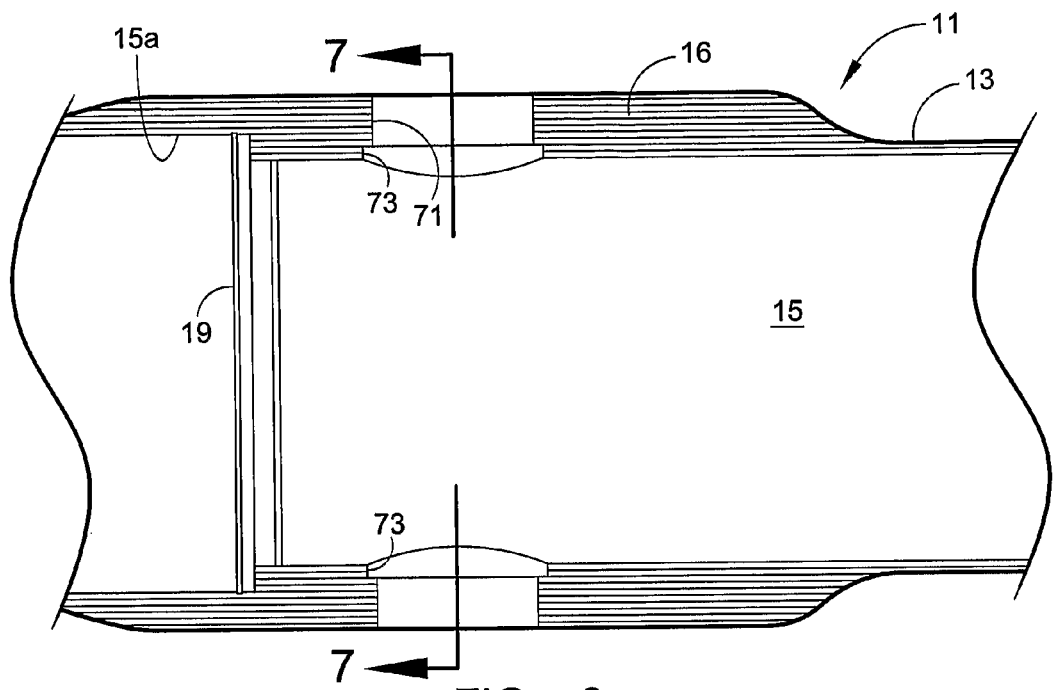
FIG. 6
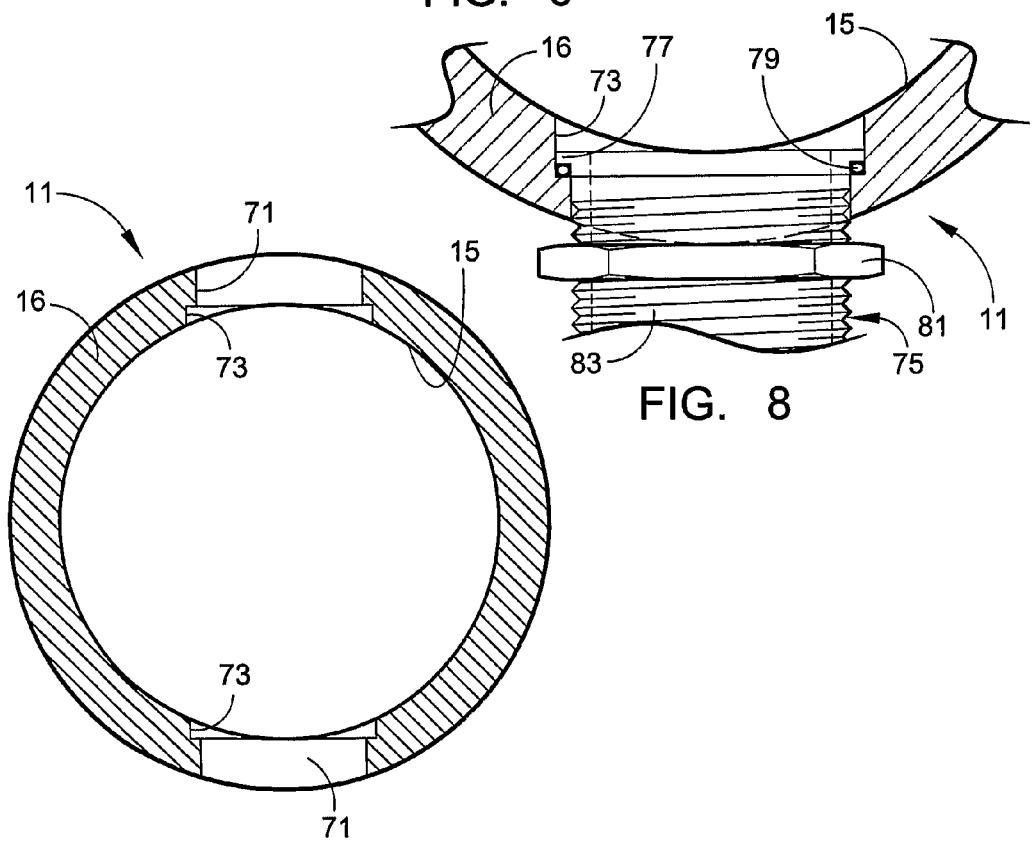
FIG. 8
FIG. 7

SIDE-PORTED FILAMENT WOUND PRESSURE VESSELS

This application claims priority from U.S. Provisional Application Ser. No. 60/670,362, filed Apr. 11, 2005.

FIELD OF THE INVENTION

This invention relates to filament wound pressure vessels, and more particularly to methods of making filament wound pressure vessels that have relatively large side ports and to the resultant pressure vessels.

BACKGROUND OF THE INVENTION

Pressure vessels and tanks useful for a variety of applications have long been made from synthetic resinous materials, such as epoxy resins, acrylic resins, and polyurethane resins, in combination with filaments having high tensile strength by impregnating such filaments with such resins. Such filament wound vessels are generally fabricated by winding a resin-impregnated fibrous strand around a rotating mandrel in a generally helical pattern in a number of superimposed layers. In some cases, the strand is wound over rounded or curved ends on the mandrel to form the heads of the vessel integral with the cylindrical wall or shell; in other cases, one or both heads are formed separately. Pressure vessels made in this manner can be constructed with adequate strength to withstand high internal pressure e.g. 150 to 1500 psig, and as such, they have found their usefulness in reverse osmosis, nanofiltration, microfiltration, and other types of crossflow fluid separation where a feedstream is supplied under pressure and undergoes membrane filtration to separate the feedstream into a permeate or filtrate stream and a concentrate stream. It has become relatively standard in the industry to provide tubular pressure vessels for such purposes that are essentially cylindrical in shape and that have end closures of a circular shape which can be locked in place after a plurality of cylindrical filtration cartridges have been inserted. U.S. Pat. No. 6,074,595 illustrates one such method for making such tubular pressure vessels, and U.S. Pat. No. 6,558,544 illustrates such a pressure vessel having circular end closures.

However, as the fluid separation industry has grown and progressed, and particularly where water separation to provide a potable water stream is involved, there have been continuing efforts to both reduce the number of plumbing connections in ordered arrays utilizing a multitude of such pressure vessels, as well as reduce the overall footprint of such an installation for space considerations. As one solution to this problem, a side port in one pressure vessel is desirably connected directly to a side port in an adjacent pressure vessel so as to, in essence, provide for a common feed to and/or a common discharge from a plurality of such aligned pressure vessels. Arrangement of interconnections between vessels in this manner can eliminate the need for manifolds which would supply an individual feed stream to each pressure vessel as well as manifolds which would collect and combine individual discharge streams from each pressure vessel. By such provision of side inlet and outlet ports in pressure vessels, it has been found that a plurality of such vessels can be very efficiently stacked and plumbed; thus, feeding to or collecting from a single vessel in the stack will allow the entire stack of vessels to be so serviced.

Now that this approach has become more generally accepted in this industry, there has become a desire to provide such side port connections in larger diameters so as to allow an even greater number of pressure vessels to be joined together in a horizontal or vertical stack of vessels without undue pressure drops at the interconnections. For a number of decades, a variety of approaches have been taken to providing side and end ports in filament wound pressure vessels of this general type. U.S. Pat. Nos. 3,106,940; 3,112,234; 3,293,860; 4,391,301; 4,614,279; 4,685,589; 4,700,868; 4,765,507; 5,900,107; 5,979,692; 6,074,595 and 6,179,154 show various methods which have been employed to provide ports in an end and/or sidewall of a pressure vessel that is being fabricated by a filament winding process. For example, annular fibrous patches bonded with a curable thermosetting resin have been applied to a partially formed vessel wall and carefully placed to surround the location where an opening is to be cut, as described in U.S. Pat. No. 3,106,940, whereupon one or more additional layers of sidewall are overwrapped. In many instances, an additional circumferentially wound annular patch is positioned in alignment with the first patch, followed by additional layers of the fibrous material then being wound or laid up over the second patch. In the final cured vessel, the patches have become embedded within the wall of the vessel, and the opening is then cut through the patched area. Although effective for lower pressure operation and smaller diameter ports, this method not only interrupts the fabrication process but also requires careful manual placement of the patches.

The '279 patent shows the application of a composite reinforcement patch or pad comprising alternating layers of woven material and random-oriented fibrous mat material which is applied directly to a thermoplastic vessel liner at a location desired for a side port, prior to the conventional filament overwinding operation, thereby placing this port-surrounding reinforcement between an interior thermoplastic liner and the exterior wound filament vessel. Once the winding operation is complete and the resin cured, an opening is cut through the filament wound tank wall in the region of the patch, and a fitting is installed by insertion through the opening and securing it in place by a washer and a threaded nut, or other fastener. Again this method is effective for small diameter ports and operation at low pressure, but it requires an interior liner and careful manual placement.

The '301 patent shows the reinforcement of the sidewall of a filament wound pressure vessel by first winding the vessel in its normal fashion and then carefully overwinding the filament wound vessel with a series of reinforcement bands 3 of filaments that will be cured along with the vessel sidewall. Pairs of these reinforcement bands 3 are wound around the vessel at approximately 25° angles at locations which flank an intended side port, and a pair of likewise flanking hoop reinforcement bands are overwound atop these pairs of angular reinforcing bands to complete the reinforcement. As depicted, the bands are carefully located so as to lie adjacent to and surround the hole that will be cut through the sidewall for a side port; thus, precise manual control and placement are required.

Although these various methods of installing side ports in a pressure vessel have been adequate for side ports of limited diameter, for example side ports up to about 5 cm in diameter, the installation of side ports greater than 6.5 cm has been troublesome from the standpoint of stability over the lifetime of the pressure vessel, particularly when the vessel was to be subjected to pressures about 150 psig and above. Often these prior art side port reinforcements would have a tendency to undergo laminar separation and/or movement resulting in failure and/or leakage at the side port. As a result, solutions were sought for this problem in order to facilitate the incorporation of relatively large side ports in tubular filament wound vessels, particularly in pressure vessels that will accommodate relatively high internal pressures, often as high as 800-1500 psig; in addition, solutions that would permit automated fabrication and not require interruption and/or careful manual control were a particular goal. By relatively large side ports is meant a side port having a diameter equal to at least about 35% of the interior diameter of the pressure vessel.

SUMMARY OF THE INVENTION

It has been found that a pressure vessel having such relatively large side ports can be effectively constructed by providing an annular reinforcement belt that completely encircles the body of the tubular vessel. Such reinforcement belt preferably extends for an axial length of at least about twice the diameter of the vessel and covers the complete surface of this axial region. By creating such a vessel-encircling reinforcement belt by applying high tensile strength filaments, under uniform, reasonably high tension, and then overwinding one or more such reinforcement belts on the mandrel with filamentary material in a relatively normal manner, a pressure vessel that will accommodate such relatively large side ports can be produced by automated fabrication. After the entire wound vessel has been cured, it has been found that the reinforcement belt has become essentially an integral part of the vessel sidewall structure and can accommodate the cutting of the vessel sidewall to create one or more apertures for side port fixtures at any angular location within such an annular reinforcement belt. It has been found that such a vessel is free from the potential problems that resulted in failure when relatively large side ports were heretofore attempted to be employed in filament wound pressure vessels that were expected to operate for extended periods of time at relatively high pressures. Winding under such tension in effect prestresses the reinforcement belt region, and the presence of such tension throughout the final vessel is attained by winding the entire vessel by using the same strands of continuous filaments, which are maintained under tension throughout the operation and then tied off. The entire fabrication process is readily automated, saving labor costs, and regardless of where an opening for the side port is cut in the reinforcement belt, there will be integral strands of filament immediately flanking the opening and providing adequate strength to resist high internal pressure within the vessel.

In one particular aspect, the invention provides a method of making a filament-wound cylindrical pressure vessel which has a relative large diameter port in its sidewall and which is capable of operating at an internal pressure of about 150 psig or above, which method comprises the steps of (a) providing a mandrel having a cylindrical surface of the desired inner diameter of the pressure vessel and rotating said mandrel about an axis thereof, (b) creating a tubular reinforcement belt by helically winding a band of plurality of resin-impregnated parallel strands of filamentary material under tension about said mandrel in a region having a defined axial length of at least about twice the diameter of the mandrel to provide a plurality of reinforcing layers, each of which layers essentially completely covers the entire surface of said defined axial length region of said belt, (c) then helically overwinding said tubular reinforcement belt and the remainder of said mandrel with a band of resin-impregnated parallel strands of filamentary material under tension to provide more than one essentially complete overall outer layer, each of which outer layers extends for at least the length of the intended pressure vessel, (d) curing said layered construction to solidify same on said mandrel while said strands of filamentary material remain wound under tension, (e) removing said cured pressure vessel from said mandrel, (f) cutting at least one aperture in the sidewall of said pressure vessel within said reinforcement belt, and (g) installing a side port in said aperture.

In another particular aspect, the invention provides a method of making a filament-wound cylindrical pressure vessel which has a relative large diameter port in its sidewall and which is capable of operating at an internal pressure of about 150 psig or above, which method comprises the steps of: (a) providing a mandrel having a cylindrical surface of the desired inner diameter of the pressure vessel and rotating said mandrel about an axis thereof, (b) helically winding a band of resin-impregnated parallel strands of filamentary material under tension about said mandrel to create an innermost layer which essentially completely covers the entire surface and extends for an axial length of at least the length of the intended pressure vessel, (c) creating a tubular reinforcement belt by helically winding a band of plurality of resin-impregnated parallel strands of filamentary material under tension about said mandrel in a region having an axial length of at least about twice the diameter of the mandrel to provide at least 5 reinforcing layers, each of which layers essentially completely covers the entire surface of a defined annular region of said mandrel, (d) then helically overwinding said reinforcement belt and the remainder of said mandrel with a band of resin-impregnated parallel strands of filamentary material under tension to provide more than one essentially complete outer layer, each of which outer layers extends for at least the length of the intended pressure vessel, (e) curing said layered construction to solidify same on said mandrel while said strands of filamentary material remain wound under tension, (f) removing said cured pressure vessel from said mandrel, (g) cutting at least one aperture in the sidewall of said pressure vessel within said reinforcement belt, and (h) installing a side port in said aperture.

In a further particular aspect, the invention provides a filament-wound cylindrical pressure vessel which has at least one large port in its sidewall, which vessel comprises: a tubular body having a cylindrical interior surface which extends for a major proportion of its axial length and has a constant inner diameter of at least about 20 cm, a sidewall portion of said tubular body including (a) an innermost layer of a helically wound band of resin-impregnated strands of filamentary material, which innermost layer extends from end to end of said tubular body, (b) an annular reinforcement belt located along an axial section of the outer surface of said innermost layer, which belt is formed by a plurality of essentially complete, reinforcing layers of helically wound bands under tension, the axial length of said belt being at least about 40 cm, and (c) at least first and second essentially complete, outer layers formed of helically wound bands of resin-impregnated strands of filamentary material, said first layer being disposed upon outer surfaces of said reinforcement belt and of said innermost layer, and both said outer layers extending for the length of said tubular body, all said layers being integrally joined to one another as a result of the occurrence of the substantially simultaneous solidification of said resin which impregnates said strands, at least one aperture through the sidewall of said pressure vessel located in said reinforcement belt, and a side port having a diameter of about 7 cm or greater disposed in said aperture, said vessel being capable of operating at an internal pressure of about 150 psig or above.

BRIEF DESCRIPTION OF THE DRAWINGS

FIG. 6 is a fragmentary longitudinal sectional view of one end of the filament wound vessel of FIG. 1, without its end closure, that schematically illustrates the reinforcement belt which is sandwiched between one innermost layer and two outer layers that constitute the overall pressure vessel sidewall, showing the vessel after a pair of diametrically opposed apertures have been cut in the belt region near one end to accommodate two side port fittings.

FIG. 7 is a transverse sectional view taken generally along the line 7-7 of FIG. 6.

FIG. 8 is a fragmentary sectional view, of the structure of FIG. 7, partially in elevation, showing a side port fitting installed in the lower aperture.

DETAILED DESCRIPTION OF THE PREFERRED EMBODIMENTS

Figure 1:
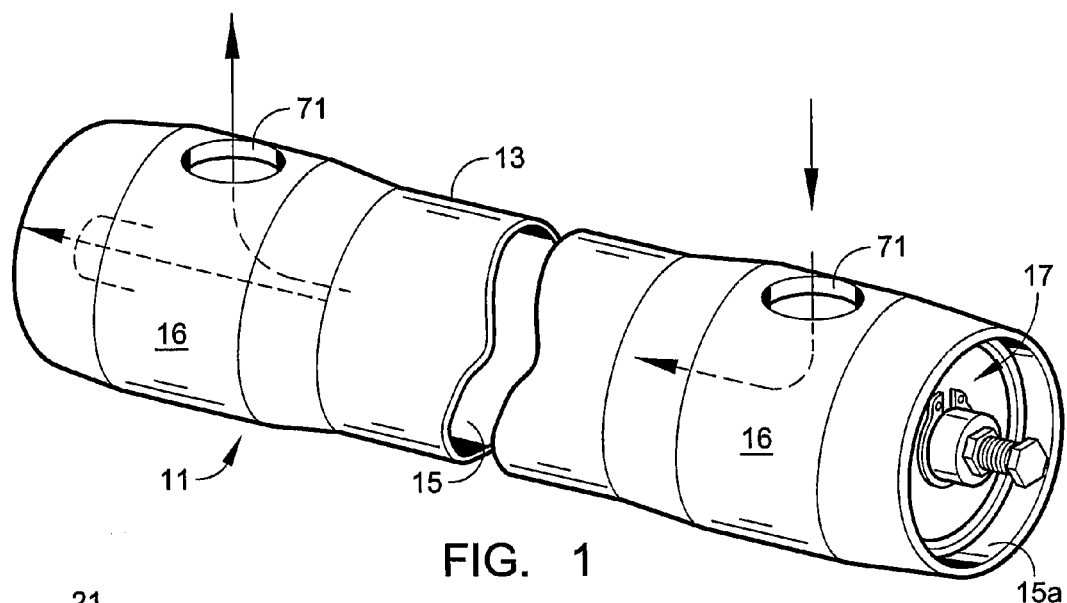
FIG. 1 is a perspective view of a crossflow filtration pressure vessel having apertures to accommodate relatively large side ports and embodying various features of the present invention.

FIG. 1 of the drawings illustrates a cylindrical wall vessel or tank 11 adapted to contain a fluid under high pressure, for example at least about 150 psig, and oftentimes pressures of about 300 psig or 800 psig, or even as high as about 1500 psig. The vessel 11 includes a generally tubular shell or housing 13 which contains a continuous interior bore 15 of right circular cylindrical shape; except for the provision of two slightly enlarged counterbore regions 15a at the ends which are preferably of similar construction. The exterior surface of the pressure vessel shell is also generally cylindrical except for two annular regions 16 which are respectively located near each of the ends of the vessel where reinforcement belts are created. The cylindrical interior bore 15 allows the insertion and removal of a plurality of cylindrical filtration cartridges, designed for cross-flow filtration, as is well known in this art. These cartridges are received within the pressure vessel and connected in serial fashion, end-to-end, by suitable interconnectors as well known in this art. The counterbores 15a allow the installation of circular end closures 17 (one of which is shown in FIG. 1) which are locked in place as by insertion of a locking ring in a groove 19 (FIG. 6) to secure the interior of the pressure vessel for high pressure operation. An example of such a construction is shown in the '544 patent, the disclosure of which is incorporated herein by reference.

The greater wall thickness provided by the belts in the reinforcement regions 16 located near the upstream and downstream ends of the pressure vessel accommodates the installation of recessed side port fittings, as will be explained in detail hereinafter. These thicker, reinforced sidewall sections, which accommodate the cutting of openings for side ports, are created by winding such a belt using a plurality of reinforcement layers, each of which encircles the entire vessel and is bonded as an integral portion of the sidewall, by preferably being sandwiched between overall layers of resin-impregnated filamentary material, interior and exterior of each reinforcement region, that constitute the pressure vessel.

The pressure vessel sidewall 13 is formed of strands of filamentary material impregnated with a thermosetting resin. The filamentary material can take the form of continuous glass fibers or filament; synthetic fibers, such as nylon, Dacron, Orlon or rayon, or even metal filaments, such as steel. A plurality of continuous, substantially endless lengths or strands of such filamentary material are helically wound about a rotating cylindrical mandrel, in the form of a flat band of desired width, termed bandwidth.

It is well known in this art to wind a band of filamentary strands about a rotating mandrel in a generally helical pattern, laying down a desired number of superimposed layers to form a pressure vessel sidewall of desired strength, as illustrated, e.g. in the '595 patent and in U.S. Pat. No. 3,112,234, the disclosures of which are incorporated by reference. By using a mandrel having one rounded or curved end, a tank head can be formed integrally with the hollow cylindrical sidewall of the tank; however, primary interest lies in the production of vessels, both ends of which are formed identically to accommodate circular end closures. Such closures are secured within the open ends of such a cylindrical sidewall vessel, such as shown in the '544 patent or in U.S. Pat. No. 5,720,411.

The resin employed to impregnate the filamentary material can be any conventional thermosetting resin, such as epoxy resins, polyurethane resins, polyester resins, alkyd resins, urea-formaldehyde resins, melamine-formaldehyde resins, and the like. The resin can be applied to the filamentary material in any suitable manner, such as spraying, dipping, brushing, doctoring or the like, and the resin can be in the liquid uncured state or in a partially cured state when the strands are wound to form the tubular reinforcement regions and sidewall. It is also known to promote the curing of the resin during the winding if desired.

Figure 2:
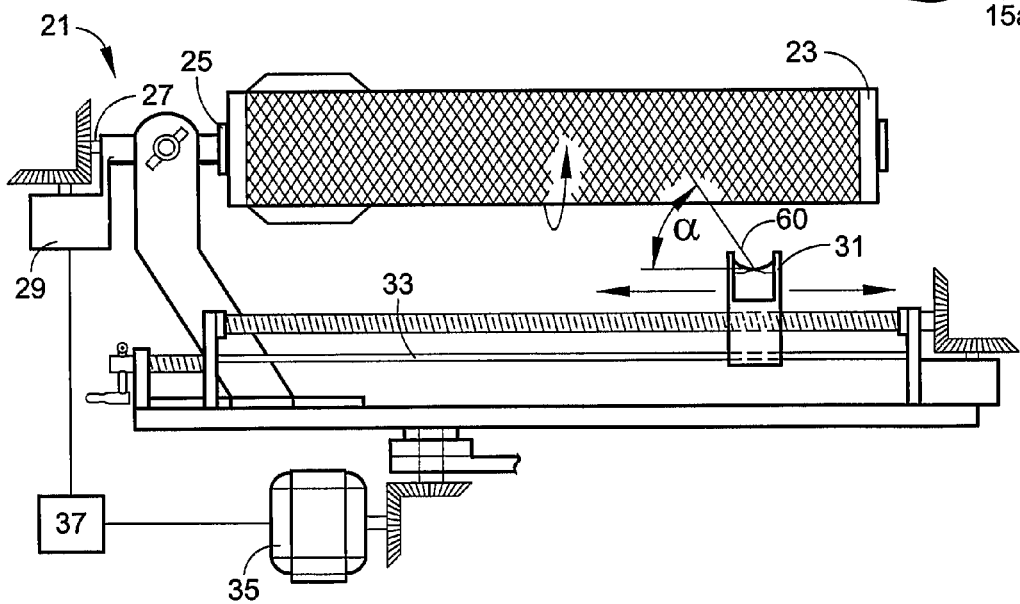
FIG. 2 is a schematic drawing showing a filament winding method which may be used to carry out a fabrication of a fiber-reinforced, polymeric pressure vessel embodying various features of the invention.

State of the art equipment is commercially available to serve as the filamentary winding apparatus of a type shown schematically in FIG. 2 which very generally shows a machine that includes a cylindrical mandrel 23 which is mounted for revolution about its axis, which forms a major part of the overall machine body. Although not illustrated schematically, it is common that one end of the mandrel 23 is supported in a spindle while the other is secured to a suitable chuck 25 which connects to a drive shaft 27 that is rotated by a suitable drive motor 29. A portion of the machine frame supports a carriage 31 which reciprocates back and forth along one or more rails 33 that extend along the entire length of the mandrel 23 and usually for a short distance beyond either end. The carriage 31 is suitably driven by a motor 35, and it is automated via a control system 37 that is capable of accepting a complex set of instructions to program the entire winding of a pressure vessel in a continuous manner.

Figure 3:
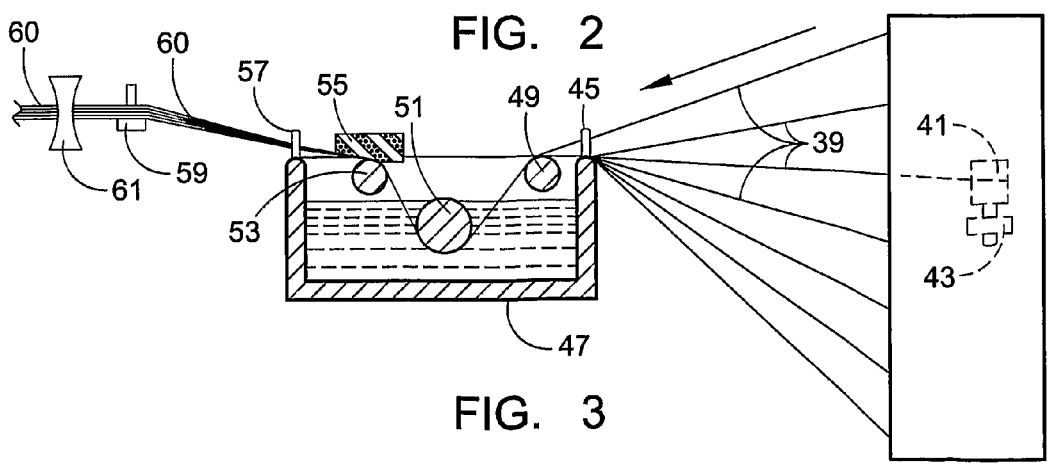
FIG. 3 is a schematic view, in side elevation, of a representative winding apparatus showing a plurality of strands of filaments being fed through a resin bath and then gathered as a band which is adjusted to create the desired bandwidth for application in the helical winding operation depicted in FIG. 2.

As seen in FIG. 3, the winding equipment draws a plurality of continuous strands 39 of filamentary material from a plurality of spools 41. Each strand may comprise groups of glass fiber yarns gathered and twisted to create a continuous filament of substantially endless length. Each of the spools 41 may be equipped with a tension control device 43 which maintains a desired tension on each individual strand 39 that is being helically wrapped about the rotating mandrel. For present purposes, it is preferred that a tension of at least about 2 pounds, and preferably between 3 and about 6 pounds, is maintained on each of the plurality of strands 39 being used.

The strands 39 are drawn from their respective spools 41 in the creel, and the array of these strands 39 is passed through a comb 45 at the edge of a tank 47 holding a liquid resin bath. The comb 45 maintains the strands laterally separated from one another as they pass over a bar 49 located above the resin bath and then under a bar 51 that is immersed in the resin. They exit from the resin bath on the opposite side of the immersed bar 51 and pass over a second raised bar 53 where a wiper 55 is disposed to remove excess resin. From the wiper, the array of strands 39 passes through an exit comb 57, emerging as a flat band 60 of parallel strands. At least about 20 strands are used in such a winding operation, and preferably about 30 to 40 strands are used. The band travels to a second exit comb 59 which is pivotable, and by selectively turning the second comb, the bandwidth of the band is set. Alternatively, the bandwidth of the band 60, if desired, can be set by a concave roller 61 carried by the carriage 31 that delivers the strands of filaments to the mandrel 23 about which the band is being helically wound.

To begin the operation, the carriage 31 is appropriately positioned, and the band 60 of strands is fixed near the end of the mandrel 23 where it is desired that the winding operation should begin. The position of the carriage 31, relative to the location on the mandrel where the strand is initially attached, is set so as to create the desired initial wind-angle. Generally, a wind-angle α (FIG. 2) between 50° and 60° is used for winding the overall sidewall of the pressure vessel. The reinforcing belt region layers are preferably wound using an angle of at least about 55° and more preferably at least about 57°. The control system 37 regulates the speed of rotation of the mandrel and the direction and speed of the translation of the carriage 31 to achieve the winding of a complete pressure vessel from an array of substantially endless continuous strands of filamentary material. Tension is maintained on the strands 39 throughout the entire winding operation, and these pretensioned strands in the resultant cured pressure vessel provide a pretensioned tubular vessel. As is commonplace in this art, the length of the tubular structure that is wound slightly exceeds the axial length of the intended pressure vessel, and to provide a clean resultant product, the ends are subsequently trimmed.

As one representative winding of a pressure vessel having an interior diameter of 8 inches (20.3 cm), about 40 strands of fiberglass at about 3-4 pounds tension are pulled through a path of liquid epoxy resin. As generally shown in FIG. 3, they are spread to have a bandwidth of about 4 inches (10.2 cm), and they are wound about the cylindrical mandrel 23 to create a first innermost layer that will extend for the entire axial length of the desired tubular structure. When winding this innermost layer, a wind-angle α to the axis of the mandrel in excess of about 54° may, for example, be preferably used, and at this angle, three passes are used in order to be certain to cover essentially the entire surface of the mandrel. Multiple passes wherein the band of parallel strands travels from one end to the other and back are always used, and for purposes of this application, travel up and then back for the length of a particular region is considered to be one pass.

Accordingly, after the carriage 31 has traveled from its starting point to the opposite end and back, three times, the control system 37 automatically changes the winding directions to begin to wind the first layer of the reinforcing belt. This is depicted schematically in FIG. 4. The axial length chosen for the reinforcement belt region 16 is generally determined by the intended diameter of the side ports that will be incorporated into the ultimate pressure vessel. Most commonly, such relatively large diameter side ports are desired in pressure vessels having a interior diameter of at least about 20 cm, and often the diameter of the side port will be at least about 7 cm and often from 7 to 8 cm. It is found that the axial length of the reinforcement belt 16 should preferably be at least about twice the diameter of the mandrel and also should preferably be at least about three times the diameter of the side port. More preferably, the axial length of the reinforcement belt for a pressure vessel of a diameter of about 20 cm is at least about 44 cm to about 52 cm. Although the axial length of the reinforcement belt is generally sized to be between 2 and 3 times the inner diameter of the pressure vessel, other than incurring additional costs, the use of a slightly longer reinforcement belt should not be detrimental.

Figure 4:
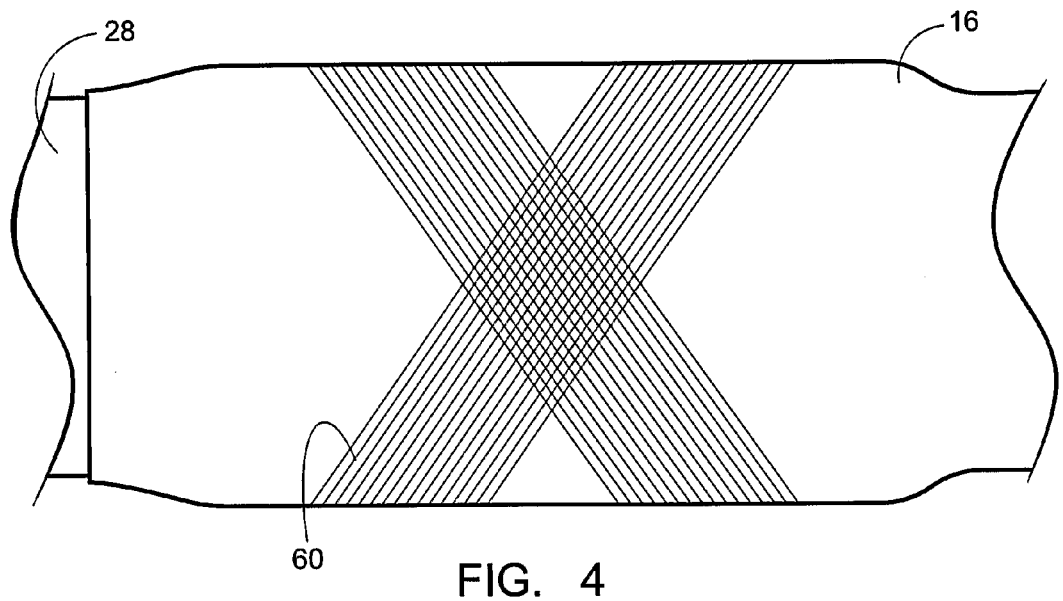
FIG. 4 is a fragmentary view schematically showing the winding of a reinforcement belt on a rotating mandrel.
Figure 5:
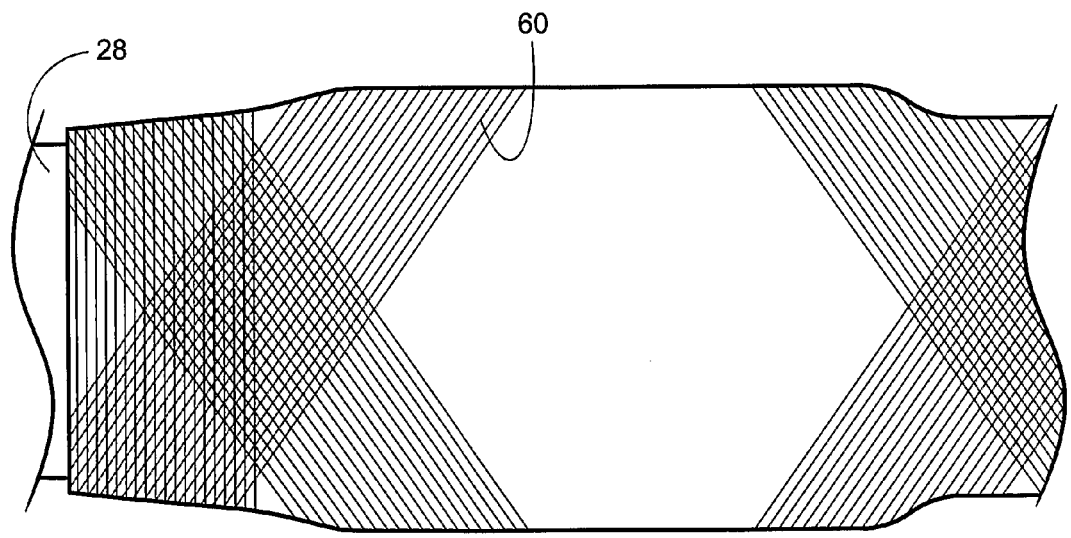
FIG. 5 is a schematic view showing the overwinding of an overall sidewall layer atop the reinforcement belt.

A common size pressure vessel for cross-flow filtration cartridges in the United States has an interior diameter of 8 inches (20.3 cm). Assuming a 3 inch (7.6 cm) diameter side port fitting is contemplated to be installed in such a pressure vessel, a wind-angle of about 57° may be used for the reinforcement belt, and the spreading device 59 or 61 is regulated to change the bandwidth to between 3 to 4 inches (7.6 cm-10 cm), e.g. about 3.3 inches (8.4 cm), which is less than the bandwidth used to wind the innermost overall layer. As can be seen from FIG. 4, during the winding of the reinforcement belt, there will be more limited back and forth movement of the carriage, and accordingly, five complete passes, instead of 3, are employed in order to lay down each essentially complete layer which will constitute the reinforcement belt. Generally at least about five layers are employed to create the reinforcement belt 16, and preferably seven or more reinforcement layers are employed depending upon the intended internal pressure at which the pressure vessel will be operated. In winding these layers with passes of the band up and down the desired axial length, there will be a thinner region where the band being helically wound halts its travel in one direction and reverses to travel in the opposite axial direction as can be seen in FIG. 4. Moreover, each of the 5 passes within one layer is programmed to encompass a just slightly lesser distance so that there will be a smooth angular incline flanking both ends of the reinforcement belt region 16. For example, where a pressure vessel is being constructed that will be rated to operate at about 150 psig internal pressure, seven reinforcement layers may be employed.

At the end of winding the reinforcement belt 16 at one end of the tubular structure, the control system changes the wind-angle to about 75° to 80° and the carriage 31 moves to a location near the opposite axial end of the mandrel 23 by winding the band 60 essentially circumferentially in hoop-like fashion. Upon arrival, the apparatus begins to wind a similar reinforcement belt at that end, maintaining the continuity of the forty strands of filamentary material that make up the band 60 that is being helically wound onto the rotating mandrel. The winding process just described is repeated to carry out five passes for each layer, again using a wind-angle of about 57°; thus for the seven layers, total of 35 short passes are used. At the conclusion of winding the second reinforcement belt region, the carriage 31 travels back to the end of the mandrel where the operation began, where the control system 37 readjusts the bandwidth of the resin-impregnated strands to about 4 inches and the wind-angle to about 54°; however, a bandwidth as low as 3 inches might now be used. The program then causes the carriage 31 to overwind both of the reinforcement belts by laying down two additional outer overall layers, each having essentially the same length as the innermost layer first laid down; however, this time each layer is a product of 4 passes up and down the mandrel, for a total of eight more passes. At the end of this, the fabrication of the vessel is essentially complete, and the control system 37 returns the wind-angle at one end to about 75° to 80° and circumferentially winds the band 60 in hoop-like fashion; this effects a tying off of the strands and thereby maintains the tension within the multiple layers that were wound about the rotating mandrel.

Following the conclusion of the winding of the resin-impregnated strands, and assuming curing was not being effected during winding, the entire mandrel is transported to an oven where the filament-wound tubular structure is cured as known in this art. For example, using a standard epoxy resin, curing at a temperature between about 80° and about 150° C. for at least four hours, e.g. 4-10 hours, would constitute a reasonable curing cycle.

After removal from the oven, and cooling to ambient temperature, the tubular shell 13 of the pressure vessel is removed from the mandrel 23, and machining is done as is common in this state of the art to trim the ends. At this time, one or more apertures 71 are cut in the sidewall at the location of the reinforcement belt 16, preferably at locations generally centrally of the axial length of the belt 16. FIGS. 6 and 7 show two such apertures 71 cut in the sidewall, centrally of the belt 16 at 180° to each other. An inner counterbore 73 is used in each aperture 71 to permit installation of a completely recessed side port fitting 75 in the aperture. As depicted in FIG. 8, the fitting 75 may have a circular flange 77 at its interior end that will fit snugly inside the counterbore and be sealed by an O-ring seal 79 or the like. In order to provide full bore access throughout the pressure vessel, it is important that the face of the flange 77 of the side port fitting not extend into the region of the 8-inch diameter interior bore 15. A suitable locknut 81 or the like is provided that is received on the threaded end 83 of the fitting 75 and seats against the exterior surface of the pressure vessel 11, thus tightly securing the side port fitting in the aperture 71. Oftentimes a second similar side port fitting 75 will be installed at 180° thereto, in a diametrically opposed aperture 71 cut diametrically across the pressure vessel so as to provide liquid communication between a series of such pressure vessels 11 in a vertical stack, for example. A significant advantage of the employment of the reinforcement belt 16 as just described, which covers the complete annular surface of the region, is that it not only allows the cutting of an aperture 71 for a side port at any angular location within the reinforcement belt region, but it also requires no additional sidewall fabrication to permit installation of two side ports near one end of a tubular pressure vessel.

8-inch diameter pressure vessels 11 that were fabricated as just described, using seven such layers of reinforcement over an axial region of about 52 cm, have been operated with internal pressures of 150 psig without showing signs of leakage or failure, and they are expected to be able to continue to operate at such pressures indefinitely. Similarly, 8-inch diameter pressure vessels having nine such reinforcement layers and similar 3-inch side ports have been operated at 800 psig internal pressure without indication of leakage or failure, and they are likewise considered to be suitable for operation under such conditions for indefinite periods.

Although the invention has been described with regard to certain preferred embodiments, which constitute the best mode known to the inventors for carrying out the invention at the present time, it should be understood that various changes and modifications as would be obvious to one skilled in this art may be made without deviating from the scope of the invention which is defined by the claims which are appended hereto. For example, although epoxy resins and glass fiber strands are commonly used and are preferred, other resins known in this art and other reinforcing strands can be employed that can be helically wound about a rotating mandrel under similar tension. Although reference is made to the construction of pressure vessels of certain diameter sizes that are rather uniformly used at the present time, it should be understood that larger and smaller diameter pressure vessels can also be fabricated using the principles of the invention. Particular features of the invention are emphasized in the claims which follow.

The invention claimed is:

1. A filament-wound cylindrical pressure vessel having an interior diameter of at least 8 inches which vessel has a port of at least 3 inches in diameter in its sidewall and which vessel is capable of operating at an internal pressure of 150 psig or above, which vessel comprises:
   a tubular body formed with (a) an innermost layer of a helically wound band of resin-impregnated strands of filamentary material, which innermost layer extends from end to end of said tubular body, (b) an annular reinforcement belt located along an axial section of the outer surface of said innermost layer, which belt is formed by bands of a bandwidth of at least about 3.3 inches that create at least 7 essentially complete layers, each of which layers has an axial length less than the previous layer thereof, the axial length of said reinforcement belt being at least about twice said interior diameter and (c) at least first and second essentially complete, outer layers formed of helically wound bands of resin-impregnated strands of filamentary material which bands have a bandwidth of at least about 4 inches, said first layer being disposed upon outer surfaces of said reinforcement belt and said innermost layer, and both said outer layers extending for the length of said tubular body,
   all said layers being integrally joined to one another as a result of the occurrence of the substantially simultaneous solidification of said resin which impregnates said strands,
   at least one aperture which extends through the sidewall of said pressure vessel and is located in said reinforcement belt, and
   a side port fitting having a diameter of about 3 inches or greater disposed in said aperture.

2. The pressure vessel according to claim 1 wherein each of said bands that comprise said reinforcing layers includes at least about 20 of said strands of filamentary material and wherein one said reinforcement belt is located near each end of the pressure vessel.

3. The pressure vessel according to claim 1 wherein said strands of filamentary material are continuous throughout said outer layers, said reinforcing layers and said innermost layer and are tied off at one end of said tubular body by at least one circumferential hoop wrap at an angle of at least about 75°.

4. A method of making a filament-wound cylindrical pressure vessel having an interior diameter of at least 8 inches which vessel has a port of at least 3 inches in diameter in its sidewall and which vessel is capable of operating at an internal pressure of 150 psig or above, which method comprises the steps of:
   (a) providing a mandrel having a cylindrical surface of at least 8 inches in diameter and rotating said mandrel about an axis thereof,
   (b) winding an innermost essentially complete layer about said mandrel,
   (c) then creating a tubular reinforcement belt by helically winding a band of resin-impregnated parallel strands of filamentary material under tension having a bandwidth of at least about 3.3 inches atop said innermost layer in a region to create a first reinforcing layer having a defined axial length of at least about twice the diameter of the mandrel and repeating said helical winding to create a plurality of such reinforcing layers, each of which reinforcing layers essentially completely covers the defined axial length, (d) then helically overwinding said tubular reinforcement belt and the remainder of said mandrel with a band of resin-impregnated parallel strands of filamentary material under tension having a bandwidth of at least about 4 inches to provide more than one essentially complete overall outer layer, each of which outer layers extends for at least the length of the intended pressure vessel, (e) curing said layered construction to solidify same on said mandrel while said strands of filamentary material remain wound under tension, (f) removing said cured pressure vessel from said mandrel, (g) cutting at least one aperture in the sidewall of said pressure vessel within said reinforcement belt, and (h) installing a side port fitting in said aperture.

5. The method according to claim 4 wherein said band includes at least about 20 of said strands of filamentary material to provide said bandwidth, which strands are pulled through a resin bath during said helical windings of each said innermost, said reinforcement belt and said overwound overall layers, and wherein each layer of said reinforcement belt includes multiple passes along said defined axial length of said mandrel to essentially completely cover the surface thereof.

6. The method according to claim 4 wherein said parallel strands of filamentary material are pulled onto the rotating mandrel at a wind-angle of at least about 55° for a total of at least 5 passes to create each essentially complete layer of said reinforcement belt, and said overwinding is carried out to create at least 2 of said outer layers.

7. The method according to claim 4 wherein said reinforcement belt is constructed using at least 7 essentially complete layers, each of which has an axial length less than the previous layer thereof.

8. The method according to claim 4 wherein said strands are continuous throughout said outer layers, said reinforcement belt and said innermost layer.

9. The method according to claim 8 wherein said strands are pulled onto said mandrel at a tension of at least about 2 lbs. and are tied off at the end of said overwrapping using at least one circumferential hoop wrap at an angle of at least about 75°.

10. A method of making a filament-wound cylindrical pressure vessel which has an interior diameter of at least 8 inches which vessel has a port of at least 3 inches in diameter in its sidewall and which is capable of operating at an internal pressure of about 150 psig or above, which method comprises the steps of:

(a) providing a mandrel having a cylindrical surface of the desired inner diameter of the pressure vessel and rotating said mandrel about an axis thereof, (b) helically winding a band of resin-impregnated parallel strands of filamentary material having a first bandwidth of at least about 4 inches under tension about said mandrel to create an innermost layer which essentially completely covers the entire surface and extends for an axial length of at least the length of the intended pressure vessel, (c) creating a tubular reinforcement belt by helically winding a band of plurality of resin-impregnated parallel strands of filamentary material, having a second bandwidth of at least about 3.3 inches but less than said first bandwidth, under tension about said mandrel in a region having an axial length of at least about twice the diameter of the mandrel to provide at least 5 reinforcing layers, each of which layers essentially completely covers the entire surface of a defined annular region of said mandrel, (d) then helically overwinding said reinforcement belt and the remainder of said mandrel with a band of resin-impregnated parallel strands of filamentary material of said first bandwidth under tension to provide more than one essentially complete outer layer, each of which outer layers extends for at least the length of the intended pressure vessel, (e) curing said layered construction to solidify same on said mandrel while said strands of filamentary material remain wound under tension, (f) removing said cured pressure vessel from said mandrel, (g) cutting at least one aperture in the sidewall of said pressure vessel within said reinforcement belt, and (h) installing a side port fitting in said aperture.

11. The method according to claim 10 wherein said strands are continuous throughout said outer layers, said reinforcement belt and said innermost layer.

12. The method according to claim 11 wherein said strands are pulled onto said mandrel at a tension of at least about 2 lbs. and are tied off at the end of said overwrapping using at least one circumferential hoop wrap at an angle of at least about 75°.

13. The method according to claim 10 wherein said reinforcement belt is constructed using at least 7 essentially complete layers, each of which has an axial length less than the previous layer thereof, and is formed by bands of a bandwidth of at least about 3.3 inches.

* * * * *